United States Patent
Hayama et al.

(10) Patent No.: US 11,542,929 B2
(45) Date of Patent: Jan. 3, 2023

(54) CAPACITY CONTROL VALVE AND METHOD FOR CONTROLLING CAPACITY CONTROL VALVE

(71) Applicant: EAGLE INDUSTRY CO., LTD., Tokyo (JP)

(72) Inventors: Masahiro Hayama, Tokyo (JP); Hiroyuki Nishinosono, Tokyo (JP); Keigo Shirafuji, Tokyo (JP); Kohei Fukudome, Tokyo (JP); Yoshihiro Ogawa, Tokyo (JP); Daichi Kurihara, Tokyo (JP); Wataru Takahashi, Tokyo (JP)

(73) Assignee: EAGLE INDUSTRY CO., LTD.

( * ) Notice: Subject to any disclaimer, the term of this patent is extended or adjusted under 35 U.S.C. 154(b) by 49 days.

(21) Appl. No.: 16/771,548

(22) PCT Filed: Dec. 13, 2018

(86) PCT No.: PCT/JP2018/045782
§ 371 (c)(1),
(2) Date: Jun. 10, 2020

(87) PCT Pub. No.: WO2019/117225
PCT Pub. Date: Jun. 20, 2019

(65) Prior Publication Data
US 2020/0309105 A1    Oct. 1, 2020

(30) Foreign Application Priority Data
Dec. 14, 2017 (JP) .............................. JP2017-240054

(51) Int. Cl.
*F16K 11/24* (2006.01)
*F16K 31/06* (2006.01)
(Continued)

(52) U.S. Cl.
CPC .............. *F04B 27/18* (2013.01); *F16K 11/24* (2013.01); *F16K 31/0613* (2013.01); *F16K 31/126* (2013.01)

(58) Field of Classification Search
CPC ...... F04B 27/18; F04B 27/1804; F16K 11/24; F16K 31/0613; F16K 31/126
See application file for complete search history.

(56) References Cited

U.S. PATENT DOCUMENTS

| 1,614,002 A | 1/1927 | Horton ................. A62C 35/605 |
| 2,267,515 A | 12/1941 | Wilcox ............... F16K 31/0627 |

(Continued)

FOREIGN PATENT DOCUMENTS

| CN | 111279076 | 6/2020 | ............. F04B 27/18 |
| CN | 111316028 | 6/2020 | ............. F16K 31/06 |

(Continued)

OTHER PUBLICATIONS

International Search Report (ISR) dated Feb. 26, 2019, issued for International application No. PCT/JP2018/045782. (1 page).

(Continued)

*Primary Examiner* — Jessica Cahill
(74) *Attorney, Agent, or Firm* — Hayes Soloway P.C.

(57) ABSTRACT

A capacity control valve includes: a valve body (10) including first communication passages (11), second communication passages (12), third communication passages (13), and a main valve seat (15a); a valve element (21) including an intermediate communication passage (29), a main valve portion (21b), and an auxiliary valve portion 21c; a solenoid (30) that drives a rod (36) provided with an auxiliary valve seat (23c); a first biasing member (43) that biases in a valve closing direction of the main valve portion (21b); and a second biasing member (44) that biases in a valve closing direction of the auxiliary valve portion (21c), wherein the (Continued)

rod (36) moves relative to the valve element (21) to open and close the auxiliary valve portion (21c). The capacity control valve allows a liquid refrigerant to be efficiently discharged and allows a driving force of a compressor to be decreased.

7 Claims, 6 Drawing Sheets

(51) Int. Cl.
*F16K 31/126* (2006.01)
*F04B 27/18* (2006.01)

(56) References Cited

U.S. PATENT DOCUMENTS

| | | | | |
|---|---|---|---|---|
| 3,360,304 | A | 12/1967 | Adams | B61K 7/12 |
| 3,483,888 | A | 12/1969 | Hugo | F16K 15/046 |
| 4,364,615 | A | 12/1982 | Euler | F16C 27/04 |
| 4,579,145 | A | 4/1986 | Leiber | F16H 61/0251 |
| 4,615,358 | A | 10/1986 | Hammond | F15B 13/0402 |
| 4,895,192 | A | 1/1990 | Mortenson | F01M 11/04 |
| 4,917,150 | A | 4/1990 | Koch | F16K 31/0606 |
| 4,979,542 | A | 12/1990 | Mesenich | F02M 47/027 |
| 4,998,559 | A | 3/1991 | McAuliffe | F16H 61/0251 |
| 5,060,695 | A | 10/1991 | McCabe | G05D 16/2024 |
| 5,217,047 | A | 6/1993 | McCabe | F16H 16/0251 |
| 5,263,694 | A | 11/1993 | Smith | B60G 15/068 |
| 5,702,235 | A | 12/1997 | Hirota | F04B 27/1804 |
| 5,778,932 | A | 7/1998 | Alexander | G05D 16/2024 |
| 6,010,312 | A | 1/2000 | Suitou | F04B 27/1804 |
| 6,161,585 | A | 12/2000 | Kolchinsky | F05D 16/2024 |
| 6,361,283 | B1 | 3/2002 | Ota | F04B 27/1084 |
| 6,481,976 | B2 | 11/2002 | Kimura | F04B 27/1804 |
| 7,533,687 | B2 | 5/2009 | Uemura | F16K 27/048 |
| 8,021,124 | B2 | 9/2011 | Umemura | F04B 27/1804 |
| 8,079,827 | B2 | 12/2011 | Iwa | F04B 27/1804 |
| 8,225,818 | B1 | 7/2012 | Stephens | F15B 13/0442 |
| 8,651,826 | B2 | 2/2014 | Futakuchi | F04B 27/1804 |
| 9,022,346 | B2 | 5/2015 | Najmolhoda | F16K 31/0613 |
| 9,027,598 | B2 | 5/2015 | Schneider | F16K 31/0613 |
| 9,132,714 | B2 | 9/2015 | Futakuchi | F04B 27/1804 |
| 9,297,373 | B2 | 3/2016 | Bagagli | F16K 15/026 |
| 9,400,027 | B2 | 7/2016 | Imaizumi | F16F 1/32 |
| 9,453,518 | B2 | 9/2016 | Schulz | F15B 13/043 |
| 9,581,149 | B2 | 2/2017 | Ota et al. | F04B 27/1804 |
| 9,581,150 | B2 | 2/2017 | Ota et al. | F04B 27/1804 |
| 9,732,874 | B2 | 8/2017 | Saeki | F16K 31/0603 |
| 9,874,286 | B2 | 1/2018 | Bagagli | F16K 15/12 |
| 10,113,539 | B2 | 10/2018 | Sugamura | F04B 27/1804 |
| 10,519,944 | B2* | 12/2019 | Taguchi | F04B 27/1804 |
| 10,557,463 | B2* | 2/2020 | Sugamura | F04B 27/1804 |
| 10,690,125 | B2 | 6/2020 | Hayama | F04B 27/18 |
| 10,784,804 | B2 | 9/2020 | Sasaki | H02P 25/022 |
| 10,837,431 | B2 | 11/2020 | Tonegawa | F04B 49/22 |
| 2001/0003573 | A1 | 6/2001 | Kimura et al. | 417/222.2 |
| 2002/0134444 | A1 | 9/2002 | Isobe | F16K 27/041 |
| 2003/0145615 | A1 | 8/2003 | Sasaki | F16K 31/0637 |
| 2003/0202885 | A1 | 10/2003 | Taguchi | F04B 49/00 |
| 2004/0045305 | A1 | 3/2004 | Murase | F25B 49/022 |
| 2004/0165994 | A1 | 8/2004 | Umemura | F04B 27/1804 |
| 2005/0076959 | A1 | 4/2005 | Yamamoto | F16K 31/0624 |
| 2005/0151310 | A1 | 7/2005 | Rodeffer | F16F 1/32 |
| 2007/0214814 | A1* | 9/2007 | Umemura | F04B 27/1804 62/228.1 |
| 2007/0264134 | A1 | 11/2007 | Hirota | F04B 27/1804 |
| 2008/0138213 | A1 | 6/2008 | Umemura et al. | 417/222.2 |
| 2008/0175727 | A1 | 7/2008 | Umemura et al. | F04B 49/22 |
| 2009/0108221 | A1 | 4/2009 | Umemura et al. | 251/129.15 |
| 2009/0114871 | A1 | 5/2009 | Iwa | F04B 27/14 |
| 2009/0183786 | A1 | 7/2009 | Iwa | 137/487.5 |
| 2009/0256091 | A1 | 10/2009 | Nordstrom | F16K 31/0613 |
| 2010/0282991 | A1 | 11/2010 | Okamoto | F16K 31/02 |
| 2011/0061749 | A1 | 3/2011 | Okamoto | F16K 31/0655 |
| 2011/0089352 | A1 | 4/2011 | Morgan | F16K 11/0716 |
| 2012/0056113 | A1 | 3/2012 | Tano | F04B 27/1804 |
| 2012/0198992 | A1* | 8/2012 | Futakuchi | F04B 27/1804 91/505 |
| 2012/0198993 | A1* | 8/2012 | Fukudome | F04B 27/1804 91/505 |
| 2012/0211686 | A1 | 8/2012 | Okamoto | F16K 31/0655 |
| 2013/0291963 | A1* | 11/2013 | Futakuchi | B60H 1/00485 137/487.5 |
| 2014/0099214 | A1 | 4/2014 | Fukudome | 417/222.2 |
| 2014/0130916 | A1* | 5/2014 | Saeki | F04B 27/1804 137/625.48 |
| 2014/0294632 | A1 | 10/2014 | Kondo et al. | 417/434 |
| 2014/0369862 | A1 | 12/2014 | Ota et al. | F04B 27/1804 |
| 2015/0021131 | A1 | 1/2015 | Wootten | F16F 9/348 |
| 2015/0027573 | A1 | 1/2015 | Ochiai | F15B 13/0402 |
| 2015/0044067 | A1 | 2/2015 | Ota et al. | F04B 27/1804 |
| 2015/0068628 | A1 | 3/2015 | Iwa | 137/625.65 |
| 2015/0104334 | A1 | 4/2015 | Ota et al. | F04B 27/1804 |
| 2015/0275874 | A1 | 10/2015 | Ota | F04B 27/1804 |
| 2015/0345655 | A1* | 12/2015 | Higashidozono | F04B 27/1804 137/624.27 |
| 2016/0053755 | A1 | 2/2016 | Taguchi | F04B 49/22 |
| 2016/0290326 | A1* | 10/2016 | Sugamura | F04B 27/1804 |
| 2017/0284562 | A1 | 10/2017 | Hayama | F16K 41/00 |
| 2018/0156345 | A1 | 6/2018 | Kanda | F15B 13/0431 |
| 2018/0187793 | A1 | 7/2018 | Futakuchi | F04B 39/08 |
| 2018/0291888 | A1* | 10/2018 | Tonegawa | F16K 31/0624 |
| 2019/0162175 | A1 | 5/2019 | Higashidozono | F04B 27/18 |
| 2020/0032781 | A1 | 1/2020 | Higashidozono | F16K 31/0624 |
| 2020/0309105 | A1 | 10/2020 | Hayama et al. | F04B 27/18 |
| 2020/0318624 | A1 | 10/2020 | Hayama | F04B 27/18 |
| 2020/0332786 | A1 | 10/2020 | Hayama | F04B 27/1804 |
| 2020/0362974 | A1 | 11/2020 | Hayama et al. | F16K 11/24 |
| 2020/0370545 | A1 | 11/2020 | Hayama et al. | F04B 27/18 |
| 2021/0372396 | A1 | 12/2021 | Kurihara | G05D 7/0635 |

FOREIGN PATENT DOCUMENTS

| | | | |
|---|---|---|---|
| CN | 111417780 | 7/2020 | F04B 27/18 |
| EP | 2594794 | 5/2013 | F04B 27/18 |
| EP | 3726054 | 10/2020 | F04B 27/18 |
| JP | 6-26454 | 2/1994 | F04B 27/08 |
| JP | 2001165055 | 6/2001 | F04B 27/14 |
| JP | 2004003468 | 1/2004 | F04B 27/14 |
| JP | 2005307817 | 11/2005 | F04B 27/14 |
| JP | 2007247512 | 9/2007 | F04B 27/14 |
| JP | 2008157031 | 7/2008 | F04B 27/14 |
| JP | 2009275550 | 11/2009 | F04B 49/00 |
| JP | 2012144986 | 8/2012 | F04B 27/14 |
| JP | 2012211579 | 11/2012 | F04B 27/14 |
| JP | 5167121 | 3/2013 | F04B 27/14 |
| JP | 5167121 B2 | 3/2013 | |
| JP | 2014080927 | 5/2014 | F04B 27/16 |
| JP | 2014092207 | 5/2014 | F16K 31/06 |
| JP | 2014095463 | 5/2014 | F16K 31/06 |
| JP | 2014194180 | 10/2014 | F04B 27/14 |
| JP | 201575054 | 4/2015 | F04B 27/14 |
| JP | 20151168 | 5/2015 | F04B 27/14 |
| JP | 2015137546 | 7/2015 | F04B 27/14 |
| JP | 2015178795 | 10/2015 | F04B 27/14 |
| JP | 2015178795 A | 10/2015 | |
| JP | 5983539 | 8/2016 | F04B 27/18 |
| JP | 2016196825 | 11/2016 | F04B 27/18 |
| JP | 2016196876 | 11/2016 | F04B 27/18 |
| JP | 2016205404 | 12/2016 | F04B 27/18 |
| JP | 6135521 | 5/2017 | F04B 27/18 |
| JP | 2017089832 | 5/2017 | F16K 31/06 |
| JP | 2018179087 | 11/2018 | F16K 31/06 |
| WO | WO2006090760 | 8/2006 | F04B 27/18 |
| WO | WO2007119380 | 10/2007 | F04B 27/14 |
| WO | 2009025298 A1 | 2/2009 | |
| WO | WO2009025298 | 2/2009 | F16K 31/06 |
| WO | WO2011114841 | 9/2011 | F04B 27/14 |
| WO | WO2012077439 | 6/2012 | F04B 27/14 |
| WO | 2014119594 A1 | 8/2014 | |
| WO | WO2014119594 | 8/2014 | F04B 27/14 |
| WO | WO2014148367 | 9/2014 | F16K 31/06 |

(56) References Cited

FOREIGN PATENT DOCUMENTS

OTHER PUBLICATIONS

U.S. Appl. No. 61/480,281, filed Jul. 23, 2019, Higashidozono et al.
U.S. Appl. No. 16/483,621, filed Aug. 5, 2019, Higashidozono et al.
U.S. Appl. No. 16/763,800, filed May 13, 2020, Hayama et al.
U.S. Appl. No. 16/766,096, filed May 21, 2020, Kurihara et al.
U.S. Appl. No. 16/957,340, filed Jun. 23, 2020, Hayama et al.
U.S. Appl. No. 16/957,344, filed Jun. 23, 2020, Hayama et al.
U.S. Appl. No. 16/961,620, filed Jul. 10, 2020, Hayama et al.
U.S. Appl. No. 17/293,435, filed May 12, 2021, Hayama et al.
U.S. Appl. No. 16/772,703, filed Jun. 12, 2020, Hayama et al.
U.S. Appl. No. 14/431,270, filed Mar. 25, 2015, Higashidozono et al.
The First Office Action issued in Chinese Patent Appln. Serial No. 20180081296.0, dated Jul. 5, 2021, with English translation, 9 pages.
Extended European Search Report issued in European Patent Appln. Serial No. 18896700.4, dated Aug. 12, 2021, 8 pages.
European Official Action issued in related European Patent Application Serial No. 18885296.6, dated Jan. 21, 2022, 4 pages.
European Official Action issued in related European Patent Application Serial No. 18897846.4, dated Apr. 14, 2022 (5 pgs).
Korean Official Action issued in related Korean Patent Application Serial No. 10-2020-7013914, dated Mar. 15, 2022 (5 pgs).
Chinese Office Action issued in Chinese Patent Appln. Serial No. 201880080867.9, dated Mar. 16, 2022, with English translation, 13 pages.
International Preliminary Report on Patentability issued in PCT/JP2018/047716, dated Jun. 30, 2020, 8 pages.
International Search Report and Written Opinion issued in PCT/JP2018/047716, dated Mar. 26, 2019, with English translation, 14 pages.
International Preliminary Report on Patentability issued in PCT/JP2014/051901, dated Aug. 13, 2015, 7 pages.
International Search Report issued in PCT/JP2014/051901, dated Apr. 18, 2014, 4 pages.
International Preliminary Report on Patentability, International Search Report and Written Opinion issued in PCT/JP2019/045731, dated Feb. 4, 2020, 21 pages.
International Search Report issued in PCT/JP2018/004500, dated May 15, 2018, 12 pages.
International Preliminary Report on Patentability issued in PCT/JP2018/004500, dated Aug. 20, 2019, 4pages.
International Search Report issued in PCT/JP2018/041768, dated Jan. 22, 2019, 12 pages.
International Preliminary Report on Patentability issued in PCT/JP2018/041768, dated May 19, 2020, 6 pages.
International Search Report issued in PCT/JP2018/002084, dated Apr. 17, 2018, 11 pages.
International Preliminary Report on Patentability issued in PCT/JP2018/002084, dated Jul. 30, 2019, 4 pages.
International Search Report issued in PCT/JP2018/047693, dated Mar. 19, 2019, 11 pages.
International Preliminary Report on Patentability issued in PCT/JP2018/047693, dated Jun. 30, 2020, 4 pages.
International Search Report issued in PCT/JP2018/047694, dated Mar. 19, 2019, 20 pages.
International Preliminary Report on Patentability issued in PCT/JP2018/047694, dated Jun. 30, 2020, 7 pages.
International Search Report issued in PCT/JP2018/045010, dated Feb. 26, 2019, 11 pages.
International Preliminary Report on Patentability issued in PCT/JP2018/045010, dated Jun. 9, 2020, 4 pages.
International Search Report issued in PCT/JP2019/001569, dated Apr. 16, 2019, 20 pages.
International Preliminary Report on Patentability issued in PCT/JP2019/001569, dated Oct. 15, 2018, 7pages.
International Search Report and Written Opinion with translation issued in PCT/JP2019/001570, dated Jul. 25, 2019 (19 pages).
International Preliminary Report on Patentability with translation issued in PCT/JP2019/001570, dated Jul. 28, 2020 (6 pages).
International Search Report and Written Opinion with translation issued in PCT/JP2018/043652, dated Feb. 19, 2019 (21 pages).
International Preliminary Report on Patentability with translation issued in PCT/JP2018/043652, dated Jun. 2, 2020 (7 pages).
International Search Report and Written Opinion with translation issued in PCT/JP2018/045782, dated Feb. 26, 2019 (11 pages).
International Preliminary Report on Patentability with translation issued in PCT/JP2018/045782, dated Jun. 16, 2020 (4 pages).
Official Action issued in related U.S. Appl. No. 16/957,340, dated Feb. 4, 2022 (18 pgs).
Official Action issued in related U.S. Appl. No. 16/957,340, dated Sep. 20, 2021 (18 pgs).
Notice of Allowance issued in related U.S. Appl. No. 16/961,620, dated Feb. 9, 2022 (6 pgs).
Notice of Allowance issued in related U.S. Appl. No. 16/772,703, dated Oct. 13, 2021 (5 pgs).
Official Action issued in related U.S. Appl. No. 16/772,703, dated Jul. 21, 2021 (6 pgs).
Official Action issued in related U.S. Appl. No. 16/961,620, dated Aug. 5, 2021 (7 pgs).
Official Action issued in related U.S. Appl. No. 17/293,435, dated Nov. 23, 2021 (12 pgs).
Official Action issued in related U.S. Appl. No. 16/961,627, dated Oct. 26, 2021 (24 pgs).
Official Action issued in related U.S. Appl. No. 16/766,124, dated Oct. 27, 2021 (11 pgs).
Notice of Allowance issued in related U.S. Appl. No. 16/766,124, dated Apr. 4. 2022 (5 pgs).
Official Action issued in related U.S. Appl. No. 16/957,341, dated Mar. 29, 2022 (19 pgs).
European Official Action issued in related European Patent Application Serial No. 19890548.1, dated May 24, 2022 (6 pgs).
European Official Action issued in related European Patent Application Serial No. 18884020.1, dated Jun. 28, 2022 (4 pgs).
Chinese Office Action issued in Chinese Patent Appln. Serial No. 201880072030.X, dated Jun. 6, 2022, with English translation, 12 pages.
Chinese Office Action issued in Chinese Patent Appln. Serial No. 201980075007.0, dated Jun. 6, 2022, with English translation, 8 pages.
Japanese Office Action issued in Japanese Patent Appln. Serial No. 2019-562060, dated May 10, 2022, with English translation, 8 pages.
Japanese Office Action issued in Japanese Patent Appln. Serial No. 2019-562061, dated May 10, 2022, with English translation, 10 pages.
Japanese Office Action issued in Japanese Patent Appln. Serial No. 2019-559188, dated Jul. 13, 2022, with English translation, 9 pages.
Official Action issued in related U.S. Appl. No. 17/293,435, dated May 31, 2022 (11 pgs).
Notice of Allowance issued in related U.S. Appl. No. 16/957,340, dated May 24, 2022 (16 pgs).
Notice of Allowance issued in related U.S. Appl. No. 16/961,627, dated May 5, 2022 (19 pgs).
Official Action issued in related U.S. Appl. No. 16/763,800, dated Jun. 8, 2022 (9 pgs).
Official Action issued in related U.S. Appl. No. 16/480,281, dated Jun. 8, 2022 (15 pgs).
Official Action issued in related U.S. Appl. No. 16/766,096, dated May 27, 2022 (7 pgs).
Official Action issued in related U.S. Appl. No. 16/771,548, dated Dec. 8, 2021 (15 pgs).
Official Action issued in related U.S. Appl. No. 16/771,548, dated Jun. 7, 2022 (11 pgs).
Official Action issued in related U.S. Appl. No. 16/483,621, dated Jun. 17, 2022 (13 pgs).

* cited by examiner

A ARROW VIEW

CAPACITY CONTROL VALVE AND METHOD FOR CONTROLLING CAPACITY CONTROL VALVE

CROSS-REFERENCE TO RELATED APPLICATIONS

This application is the U.S. National Phase under 35 U.S.C. § 371 of International Application PCT/JP2018/045782, filed Dec. 13, 2018, which claims priority to Japanese Patent Application No. JP2017-240054, filed Dec. 14, 2017. The International Application was published under PCT Article 21(2) in a language other than English.

TECHNICAL FIELD

The present invention relates to a capacity control valve suitable for controlling a flow rate or a pressure of a variable capacity compressor and a method of controlling the capacity control valve.

BACKGROUND ART

As a variable capacity compressor, for example, a swash plate type variable capacity compressor suitable for an air-conditioning system of an automobile or the like includes a rotating shaft rotationally driven by a rotational force of an engine, a swash plate coupled to the rotating shaft such that the plate's angle of inclination can be varied, a piston for compression coupled to the swash plate, and the like. By varying the angle of inclination of the swash plate to vary the stroke of the piston, the compressor controls the discharge rate of a refrigerant.

The angle of inclination of the swash plate can be continuously varied by utilizing a suction pressure in a suction chamber for drawing in the refrigerant, a discharge pressure in a discharge chamber for discharging the refrigerant pressurized by the piston, and a control chamber pressure in a control chamber (a crank chamber) in which the swash plate is housed, while appropriately controlling the pressure in the control chamber using a capacity control valve that is driven to be opened and closed by an electromagnetic force, and thereby regulating the balance of pressures acting on opposite faces of the piston.

FIG. 5 shows an example of such a capacity control valve. A capacity control valve 160 includes: a valve unit 170 having a second valve chest 182 communicating with a discharge chamber of a compressor through a second communication passage 173, a first valve chest 183 communicating with a suction chamber through a first communication passage 171, and a third valve chest 184 communicating with a control chamber through a third communication passage 174; a pressure-sensitive element 178 that is arranged in the third valve chest to extend and contract with an ambient pressure and has a valve seat element 180 provided at free end in a direction of extension and contracting; a valve element 181 having a second valve portion 176 that opens and closes a valve hole 177 communicating the second valve chest 182 and the third valve chest 184, a first valve portion 175 that opens and closes the first communication passage 171 and a flow channel 172, and a third valve portion 179 that opens and closes the third valve chest 184 and the flow channel 172 by being engaged with and disengaged from the valve seat element 180 in the third valve chest 184; a solenoid unit 190 that exerts an electromagnetic driving force on the valve element 181; and others.

Furthermore, even though a clutch mechanism is not provided in the variable capacity compressor, in a case where it becomes necessary to vary the control chamber pressure, the capacity control valve 160 can control a pressure Pc in the control chamber (a control chamber pressure) and a suction pressure Ps (a suction pressure) by making the discharge chamber and the control chamber communicate with each other (hereinafter referred to as a "conventional art". See, for example, Patent Document 1).

CITATION LIST

Patent Document

Patent Document 1: JP 5167121 B1

SUMMARY OF INVENTION

Problem to be Solved by the Invention

In the conventional art, in a case where the swash plate type variable capacity compressor is stopped for a long period of time, a liquid refrigerant (a refrigerant that has been liquefied by cooling while the compressor is inoperative) accumulates in the control chamber (the crank chamber). If the compressor is activated in this state, the preset discharge rate cannot be ensured. Therefore, in order for the desired capacity control to be performed immediately after the activation, it is necessary for the liquid refrigerant in the control chamber (the crank chamber) to be discharged as quickly as possible.

Therefore, as shown in FIG. 6, the conventional capacity control valve 160 is provided with a liquid refrigerant discharge function to discharge the liquid refrigerant in the control chamber (the crank chamber) as quickly as possible at the time of activation. That is, in a case where the variable capacity compressor has been stopped, left inoperative for a long period of time, and is then activated, the high-pressure liquid refrigerant accumulated in the control chamber (the crank chamber) flows through the third communication passage 174 into the third valve chest 184. Then, the pressure-sensitive element (the bellows) 178 contracts, and a gap opens between the third valve portion 179 and the valve seat element 180. From the third valve chest 184 through an auxiliary communication passage 185, a communication passage 186, and the flow channel 172, the liquid refrigerant is discharged from the control chamber (the crank chamber) through the suction chamber to the discharge chamber to be rapidly vaporized, enabling the compressor to be brought into a cooling operation in a short time.

However, in the above conventional art, in the early stage of the liquid refrigerant discharging process, the pressure in the control chamber is high, so that the opening of the third valve portion 179 is large and the liquid refrigerant can be discharged efficiently. Unfortunately, as the discharge of the liquid refrigerant progresses and the pressure in the control chamber decreases, the opening of the third valve portion becomes smaller, requiring time to discharge the liquid refrigerant.

Conventionally, during the liquid refrigerant discharge operation, attention has been paid only to how to complete the discharge of the liquid refrigerant in a short time, and thus the control for reducing the engine load during the liquid refrigerant discharge operation has not been performed. However, if the liquid refrigerant discharge operation is performed when the engine load is high, the engine load further increases, resulting in a decrease in energy efficiency of the entire automobile.

The present invention has been made in order to solve the problems of the conventional art, and its object is to provide a capacity control valve that controls a flow rate or a pressure of a variable capacity compressor according to a valve opening of a valve unit, in which a liquid refrigerant can be efficiently discharged regardless of a pressure in a suction chamber to shift the compressor to a cooling operation in a short time and a driving force of the compressor can be decreased during a liquid refrigerant discharge operation, and a method of controlling the capacity control valve.

Means for Solving Problem

In order to solve the above problems, a capacity control valve according to a first aspect of the present invention that controls a flow rate or a pressure of a variable capacity compressor according to a valve opening of a valve unit, characterized by including:

a valve body including first communication passages that pass fluid under a first pressure, second communication passages that are arranged adjacent to the first communication passages and pass fluid under a second pressure, third communication passages that pass fluid under a third pressure, and a main valve seat that is disposed in a valve hole communicating the second communication passages and the third communication passages;

a pressure-sensitive element that is arranged in the valve body on the side of the third communication passages and extends and contracts in response to an ambient pressure;

a valve element including an intermediate communication passage that communicates the first communication passages and the third communication passages, a main valve portion that is separated from and comes into contact with the main valve seat to open and close the valve hole, and an auxiliary valve portion that is disposed in the intermediate communication passage;

a solenoid that drives a rod provided with an auxiliary valve seat that is separated from and comes into contact with the auxiliary valve portion;

a first biasing member that biases in a valve closing direction of the main valve portion; and a second biasing member that biases in a valve closing direction of the auxiliary valve portion, wherein the rod moves relative to the valve element to open and close the auxiliary valve portion.

According to the first aspect, the rod can be moved relative to the valve element to open and close the auxiliary valve portion, so that an opening of the auxiliary valve portion can be kept in the fully open state from the start of the liquid refrigerant discharge to the completion of the liquid refrigerant discharge, and the liquid refrigerant can be efficiently discharged.

The capacity control valve according to a second aspect of the present invention is characterized in that the first biasing member is disposed between the solenoid and the valve element.

According to the second aspect, the first biasing member disposed between the solenoid and the valve element biases the valve element in a valve closing direction of the main valve portion, allowing the main valve to be closed.

The capacity control valve according to a third aspect of the present invention is characterized in that the second biasing member is disposed between the pressure-sensitive element and the auxiliary valve seat.

According to the third aspect, the second biasing member disposed between the pressure-sensitive element and the auxiliary valve seat biases the auxiliary valve portion in the valve closing direction, allowing the auxiliary valve to be closed.

The capacity control valve according to a fourth aspect of the present invention is characterized in that the rod includes a locking portion that presses the valve element in the valve closing direction of the main valve portion.

According to the fourth aspect, the locking portion provided in the rod presses the valve element, allowing the main valve to be reliably closed.

The capacity control valve according to a fifth aspect of the present invention is characterized in that the intermediate communication passage communicates with an interior space between the auxiliary valve seat and the pressure-sensitive element.

According to the fifth aspect, fluid under the first pressure can be guided to the pressure-sensitive element through the intermediate communication passage, and an opening of the main valve portion can be controlled according to the first pressure.

The capacity control valve according to a sixth aspect of the present invention is characterized in that the first pressure is a suction pressure of the variable capacity compressor, the second pressure is a discharge pressure of the variable capacity compressor, and the third pressure is a pressure in a crank chamber of the variable capacity compressor, or the first pressure is a pressure in a crank chamber of the variable capacity compressor, the second pressure is a discharge pressure of the variable capacity compressor, and the third pressure is a suction pressure of the variable capacity compressor.

According to the sixth aspect, the present invention can be applied to various variable capacity compressors.

In order to solve the above problems, a method of controlling a capacity control valve according to a seventh aspect of the present invention is characterized by including, when the auxiliary valve portion is in an open state, bringing the main valve portion from a closed state into an open state.

According to the seventh aspect, the main valve portion is opened with no biasing force of the pressure-sensitive element acting on the valve element during the liquid refrigerant discharge, causing the flow rate flowing from the discharge chamber to the control chamber to increase and causing the load on the compressor to be reduced.

DESCRIPTION OF EMBODIMENTS

Hereinafter with reference to the drawings, a mode for carrying out the present invention will be described illustratively based on embodiments. However, the dimensions, materials, shapes, relative positions, and others of components described in the embodiments are not intended to limit the present invention only to them unless otherwise explicitly described.

Figure 1:
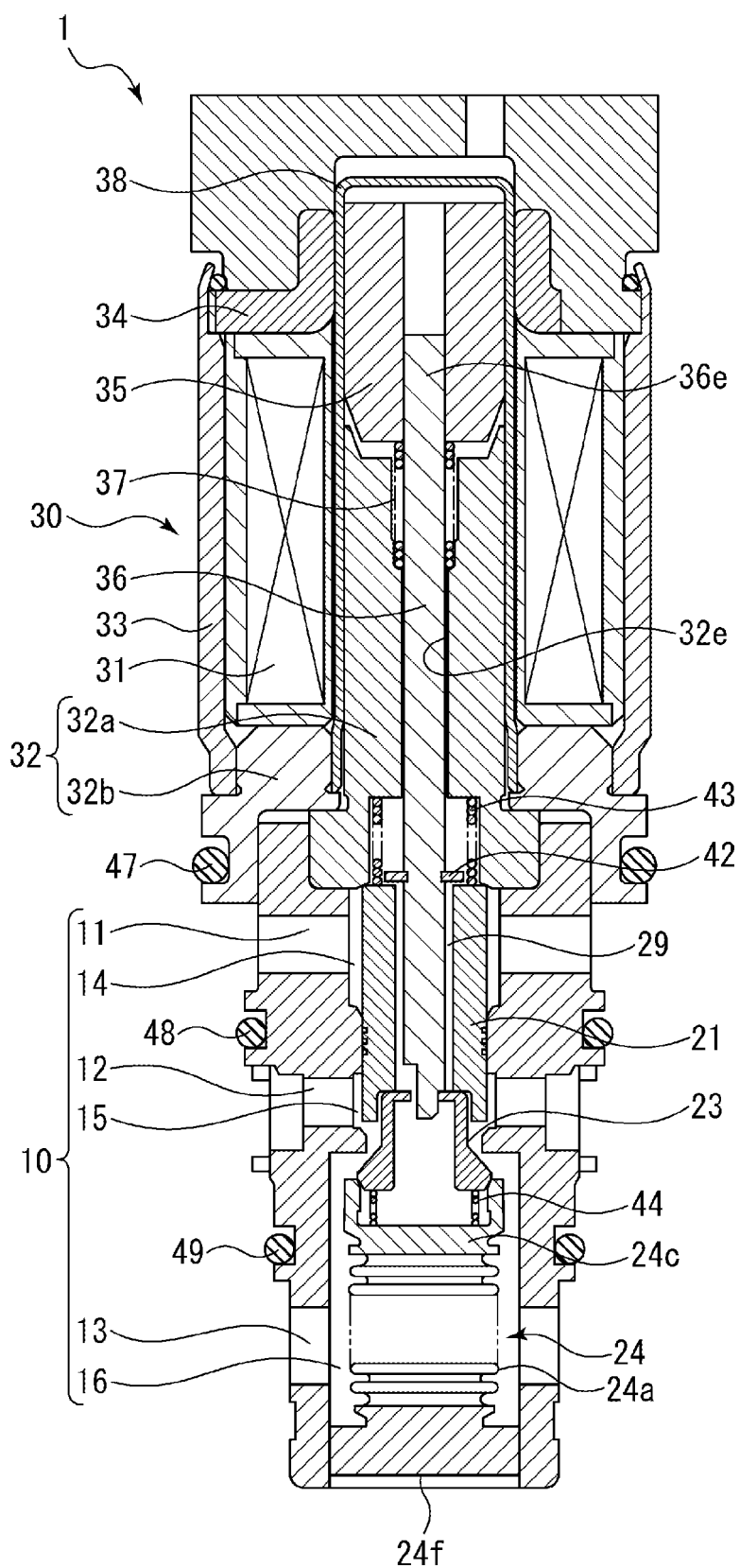
FIG. 1 is a front sectional view of a capacity control valve according to the present invention.

A capacity control valve according to the present invention will be described with reference to FIG. 1 to FIG. 4. In FIG. 1, reference numeral 1 is a capacity control valve. The capacity control valve 1 mainly includes a valve body 10, a valve element 21 and a pressure-sensitive element 24 which are disposed in the valve body 10, and a solenoid 30 attached to the valve body 10.

Figure 2:
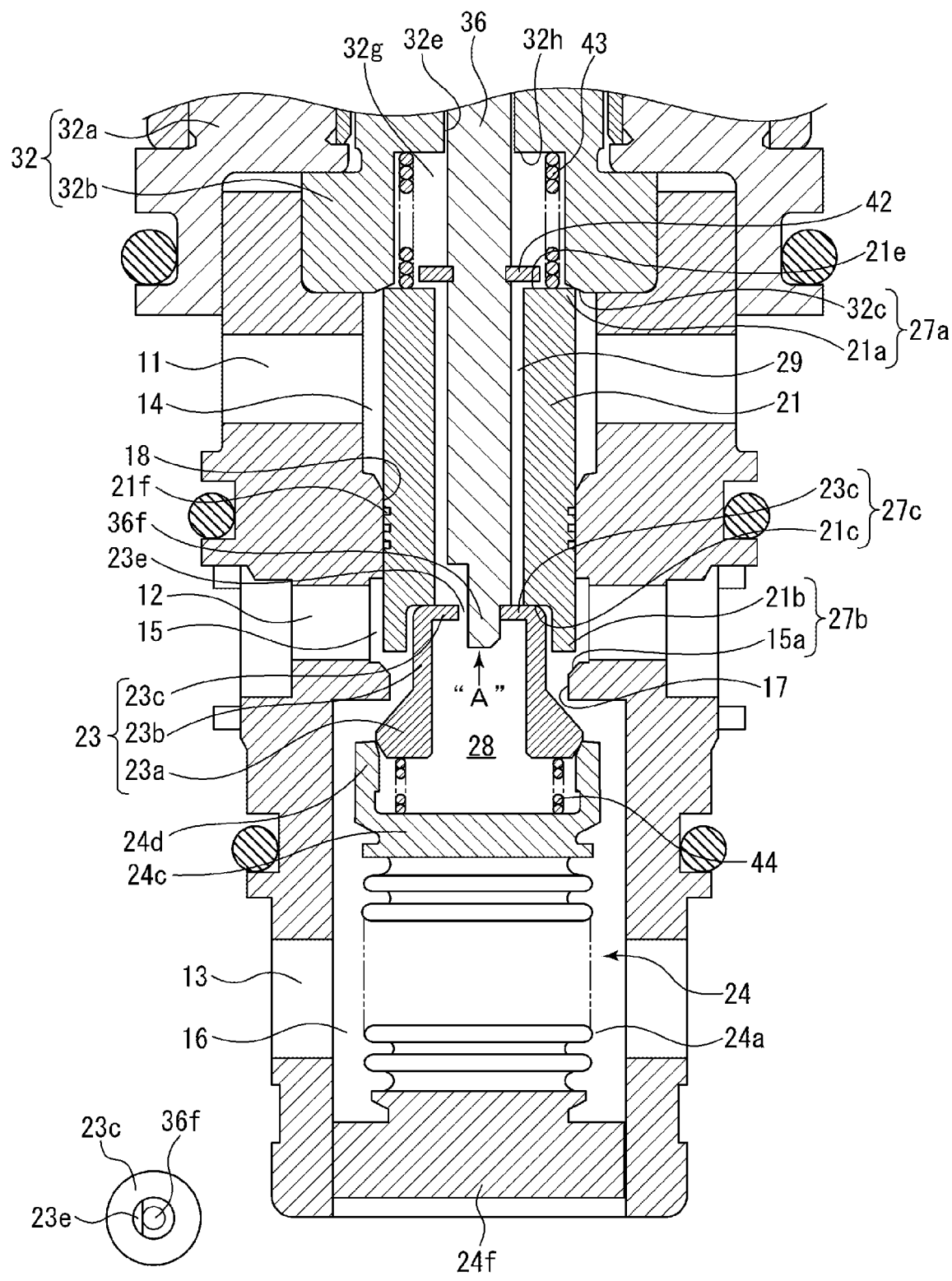
FIG. 2 is an enlarged view of a valve body, a valve element and a part of a solenoid of FIG. 1, and shows the capacity control valve when the solenoid is turned off.

Hereinafter, the respective components constituting the capacity control valve 1 will be described with reference to FIG. 1 and FIG. 2. The valve body 10 is composed of a metal such as brass, iron, aluminum, stainless steel, or a synthetic resin material, or the like. The valve body 10 is a hollow cylindrical member having a through hole that extends through it in an axial direction with a first valve chest 14, a second valve chest 15 adjacent to the first valve chest 14, and a third valve chest 16 adjacent to the second valve chest 15 continuously disposed in sections of the through hole.

Second communication passages 12 are connected to the second valve chest 15. The second communication passages 12 are configured to communicate with the interior of a discharge chamber (not shown) of the variable capacity compressor so that the opening and closing of the capacity control valve 1 allows fluid under a discharge pressure Pd (a second pressure according to the present invention) to flow from the second valve chest 15 into the third valve chest 16.

Third communication passages 13 are connected to the third valve chest 16. The third communication passages 13 communicate with a control chamber (not shown) of the variable capacity compressor so that the opening and closing of the capacity control valve 1 causes the fluid under the discharge pressure Pd flowing from the second valve chest 15 into the third valve chest 16 to flow out to the control chamber (the crank chamber) of the variable capacity compressor, or causes fluid under a control chamber pressure Pc (a third pressure according to the present invention) flowing into the third valve chest 16 to flow out from the first valve chest 14 to a suction chamber of the variable capacity compressor through an intermediate communication passage 29 described later.

Furthermore, first communication passages 11 are connected to the first valve chest 14. The first communication passages 11 guide fluid under a suction pressure Ps (a first pressure according to the present invention) from the suction chamber of the variable capacity compressor to the pressure-sensitive element 24 through the intermediate communication passage 29 described later so as to control the suction pressure of the compressor to a set value.

A hole 18 is continuously formed between the first communication passages 11 and the second communication passages 12, the hole 18 having a diameter smaller than these communication passages. The hole 18 slides in relation to a labyrinth 21*f* of the valve element 21 described later to form a seal portion to seal a gap between the first valve chest 14 and the second valve chest 15. In addition, a valve hole 17 is continuously provided between the second communication passages 12 and the third communication passages 13, the valve hole 17 having a diameter smaller than these communication passages. A main valve seat 15*a* is formed around the valve hole 17 on the side of the second communication passages 12. The main valve seat 15*a* is separated from and comes into contact with a main valve portion 21*b* described later to control the opening and closing of the communication between the second communication passages 12 and the third communication passages 13.

The pressure-sensitive element 24 is disposed inside the third valve chest 16. In the pressure-sensitive element 24, one end of a metal bellows 24*a* is joined to a partition adjustment portion 24*f* in a sealed manner. The bellows 24*a* is made of phosphor bronze, stainless steel or the like, and is designed to have a spring constant of a predetermined value. The interior space of the pressure-sensitive element 24 is a vacuum or contains air. Then, the pressure-sensitive element 24 is configured such that the pressure acts on an effective pressure-receiving area of the bellows 24*a* of the pressure-sensitive element 24 so as to operate to extend and contract the pressure-sensitive element 24. A flange portion 24*c* is disposed on the free end side of the pressure-sensitive element 24. A flange 24*d* is formed in the flange portion 24*c*, and the flange 24*d* comes into contact with a large diameter portion 23*a* of an adapter 23 described later to form an interior space 28 surrounded by the pressure-sensitive element 24 and the adapter 23. As described later, the fluid under the suction pressure Ps from the suction chamber is guided to the interior space 28, and the pressure-sensitive element 24 extends and contracts according to the suction pressure Ps. Furthermore, the flange portion 24*d* of the flange portion 24*c* is pressed by a solenoid force from the rod 36 via the adapter 23 so that the pressure-sensitive element 24 extends and contracts. That is, the pressure-sensitive element 24 extends and contracts according to the suction pressure Ps, and extends and contracts by a pressing force of the rod 36.

The partition adjustment portion 24*f* of the pressure-sensitive element 24 is hermetically fitted and fixed so as to seal off the third valve chest 16 of the valve body 10. If the partition adjustment portion 24*f* is screwed and fixed with a set screw (not shown), the spring force of the compression spring arranged in parallel within the bellows 24*a* or the bellows 24*a* can be axially moved and adjusted.

The first communication passages 11, the second communication passages 12, and the third communication passages 13 are, respectively, two to six in number, for example, and are spaced evenly around a peripheral surface of the valve body 10, extending therethrough. Furthermore, mounting grooves for O-rings are provided on the outer peripheral surface of the valve body 10 at three locations spaced apart in the axial direction. In the respective mounting grooves, O-rings 47, 48, and 49 are mounted for sealing a gap between the valve body 10 and a mounting hole (not shown) of a casing that is fitted onto the valve body 10, and respective flow paths of the first communication passages 11, the second communication passages 12, and the third communication passages 13 are configured as independent flow paths.

Next, the valve element 21 will be described. The valve element 21 is a hollow cylindrical member, the labyrinth 21*f* is formed at a substantially central portion of the outer peripheral portion in the axial direction of the valve element 21. The valve element 21 extends through the valve body 10, and the labyrinth 21*f* slides in relation to the hole 18 formed between the side of the first communication passages 11 and the side of the second communication passages 12 to form a seal portion to seal the gap between the first valve chest 14 and the second valve chest 15. Thus, the first valve chest 14 and the second valve chest 15 are configured as independent valve chests. Furthermore, the intermediate communication passage 29 is formed inside the valve element 21 to extend through it in the axial direction.

The valve element 21 extends through the valve body 10, one end of the valve element 21 is arranged on the side of the first communication passages 11 and the other end of the valve element 21 on the side of the second communication passages 12 with the labyrinth 21f interposed therebetween. A main valve portion 21b is formed at the end of the valve element 21 arranged on the side of the second communication passages 12, and the main valve portion 21b is separated from and comes into contact with the main valve seat 15a to control the opening and closing of the valve hole 17 that communicates the second communication passages 12 and the third communication passages 13. The main valve portion 21b and the main valve seat 15a constitute a main valve 27b. Here, the main valve portion 21b and the main valve seat 15a being brought from a contact state into a separated state means that the main valve 27b opens or the main valve portion 21b opens, and the main valve portion 21b and the main valve seat 15a being brought from the separated state into the contact state means that the main valve 27b closes or the main valve portion 21b closes.

Furthermore, a shutoff valve portion 21a is formed at the end of the valve element 21 arranged on the side of the first communication passages 11. The shutoff valve portion 21a comes into contact with an end 32c of a core 32 to shut off the communication between the first communication passages 11 and the intermediate communication passage 29 when the solenoid 30 described later is turned off. On the other hand, when the solenoid 30 is turned on, the shutoff valve portion 21a is separated from the end 32c of the core so that the first communication passages 11 and the intermediate communication passage 29 communicate with each other. The shutoff valve portion 21a and the end 32c of the core 32 constitute a shutoff valve 27a. The shutoff valve portion 21a and the main valve portion 21b perform opening and closing operations in opposite directions. The shutoff valve portion 21a and the end 32c of the core 32 being brought from a contact state into a separated state means that the shutoff valve 27a opens or the shutoff valve portion 21a opens, and the shutoff valve portion 21a and the end 32c of the core 32 being brought from the separated state into the contact state means that the shutoff valve 27a closes or the shutoff valve portion 21a closes.

Furthermore, an auxiliary valve portion 21c is formed at an end of the valve element 21 arranged on the side of the third communication passages 13. The auxiliary valve portion 21c is disposed radially inward of the valve hole 17. The auxiliary valve portion 21c is separated from and comes into contact with a bottom 23c of the adapter 23 described later to open and close an intermediate communication passage 29 that communicates the first communication passages 11 and the third communication passages 13. The auxiliary valve portion 21c and the bottom 23c (an auxiliary valve seat according to the present invention) of the adapter 23 constitutes an auxiliary valve 27c. The auxiliary valve portion 21c and the bottom 23c of the adapter 23 being brought from a contact state into a separated state means that the auxiliary valve 27c opens or the auxiliary valve portion 21c opens, and the auxiliary valve portion 21c and the bottom 23c of and the adapter 23 being brought from the separated state into the contact state means that the auxiliary valve 27c closes or the auxiliary valve portion 21c closes.

Next, the adapter 23 will be described. The adapter 23 is a bottomed cylindrical member and mainly includes a large diameter portion 23a formed with a large diameter, a cylindrical portion 23b formed with a smaller diameter than the large diameter portion 23a, and the bottom 23c that closes a bottom of the cylindrical portion 23b. The large diameter portion 23a comes into contact with the flange 24d of the flange portion 24c of the pressure-sensitive element 24 to form the interior space 28 between the adapter 23 and the pressure-sensitive element 24. A hole 23e is formed in the bottom 23c, and an end 36f of the rod 36 extends through the hole 23e. A part of the end 36f of the rod 36 is cut out into a flat, and the intermediate communication passage 29 and the interior space 28 communicate with each other through the hole 23e. The seal portion diameter at the shutoff valve 27a, the seal portion diameter at the main valve 27b, the seal portion diameter at the labyrinth 21f of the valve element 21, the seal portion diameter at the contact portion between the large diameter portion 23a of the adapter 23 and the flange 24d of the pressure-sensitive element 24, the effective pressure-receiving diameter at bellows 24a are set equal to each other. Thus, the fluid under the suction pressure Ps from the suction chamber is guided to the interior space 28 through the first communication passages 11, the intermediate communication passage 29 and the hole 23e, and the pressure-sensitive element 24 extends and contracts according to the suction pressure Ps.

A spring 44 (a second biasing member according to the present invention) is disposed between the large diameter portion 23a of the adapter 23 and the flange portion 24c of the pressure-sensitive element 24. A repulsive force of the spring 44 acts in a direction in to bring the auxiliary valve portion 21c into contact with the bottom 23c of the adapter 23, that is, a valve closing direction of the auxiliary valve 27c, and a valve closing direction of the shutoff valve 27a.

Next, the solenoid 30 will be described. The solenoid 30 includes the rod 36, a plunger case 38, an electromagnetic coil 31, a core 32 including a center post 32a and a base member 32b, a plunger 35, a plate 34, and a solenoid case 33. The plunger case 38 is a bottomed hollow cylindrical member with one end open. The plunger 35 is arranged so as to be axially movable with respect to the plunger case 38 between the plunger case 38 and the center post 32a arranged inside the plunger case 38. The core 32 is fitted to the valve body 10, and the core 32 is arranged between the plunger 35 and the valve body 10. The rod 36 is arranged so as to extend through the center post 32a of the core 32 and the valve element 21 arranged in the valve body 10. There is a gap between the rod 36, and a through hole 32e of the center post 32a of the core 32 and the intermediate communication passage 29 of the valve element 21, so that the rod 36 can move relative to the core 32 and the valve element 21. Furthermore, one end 36e of the rod 36 is connected to the plunger 35, and the other end 36f is connected to the adapter 23.

A spring 37 is disposed between the core 32 and the plunger 35 for biasing the plunger 35 so that the plunger 35 is separated from the core 32. The biasing force of the spring 37 acts on the rod 36 in the valve closing direction of the shutoff valve 27a, in a valve opening direction of the main valve 27b, and in the valve closing direction of the auxiliary valve 27c.

Furthermore, the open end of the plunger case 38 is fixed to an inner periphery of the base member 32b of the core 32 in a sealed manner, and the solenoid case 33 is fixed to an outer periphery of the base member 32b in a sealed manner. In addition, the electromagnetic coil 31 is arranged in a space surrounded by the plunger case 38, the base member 32b of the core 32, and the solenoid case 33, and does not come into contact with the refrigerant, allowing a decrease in insulation resistance to be prevented.

Next, a spring 43 (a first biasing member according to the present invention) will be described. The spring 43 is disposed between the core 32 of the solenoid 30 and the valve element 21. Specifically, one end of the spring 43 is in contact with a bottom 32h of a recess 32g of the core 32, and the other end thereof is in contact with an end 21e of the valve element 21 on the side of the shutoff valve portion 21a. Thus, the biasing force of the spring 43 acts in a direction to open the shutoff valve 27a and in a direction to close the main valve 27b. The biasing force of the spring 44 is set to be larger than the biasing force of the spring 43.

The operation of the capacity control valve 1 having the configuration described above will be described. A flow path from the third communication passages 13 to the first communication passages 11 through the intermediate communication passage 29 is hereinafter referred to as a "Pc-Ps flow path". In addition, a flow path from the second communication passages 12 to the third communication passages 13 through the valve hole 17 is hereinafter referred to as a "Pd-Pc flow path".

First, the movement of the rod 36 and the movement of each valve portion of the valve element 21 will be described. First, when the solenoid 30 is in a non-energized state, the rod 36 is pushed upward by the biasing force of the spring (FIG. 1). Furthermore, since the biasing force of the spring 44 is larger than the biasing force of the spring 43, the valve element 21 and the adapter 23 move upward integrally, with the auxiliary valve 27c in a closed state, so that the main valve 27b is fully opened, and the shutoff valve 27a is fully closed.

Figure 3:
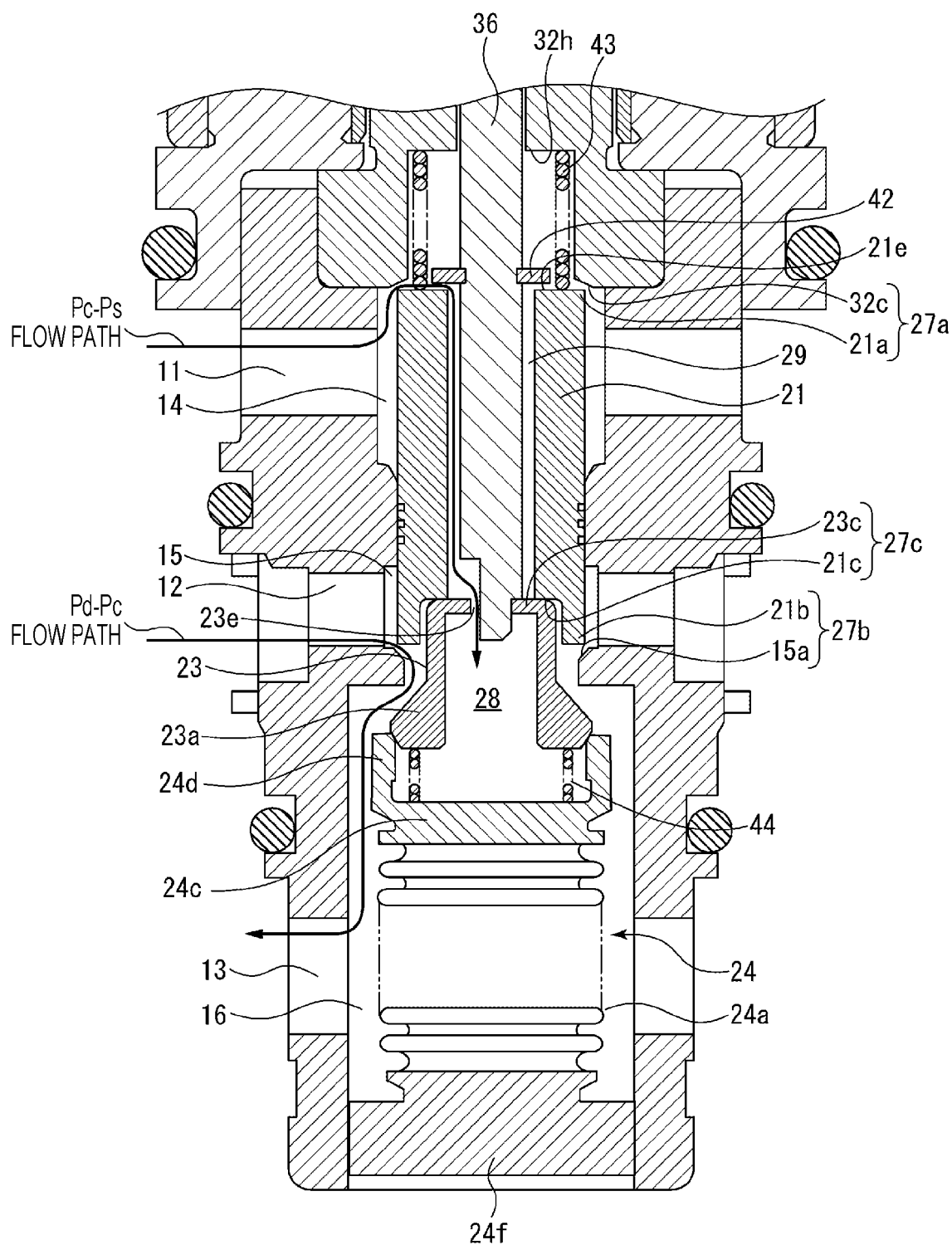
FIG. 3 is an enlarged view of the valve body, the valve element, and a part of the solenoid of FIG. 1, and shows a control state of the capacity control valve.

Next, as shown in FIG. 3, when the solenoid 30 starts to be energized from the non-energized state, the rod 36 is gradually driven in an advancing direction (in the direction in which the rod 36 projects outward from the end 32c of the core 32). At this time, the downward biasing force of the solenoid 30 and the spring 43 exceeds the upward biasing force of the spring 44 and the pressure-sensitive element 24, so that the rod 36, the valve element 21, and the adapter 23 move downward integrally, that is, with the auxiliary valve 27c in the closed state. Thus, the shutoff valve portion 21a is separated from the end 32c of the core 32, so that the shutoff valve 27a opens from the fully closed state, and the main valve 27b is gradually narrowed from the fully open state.

Figure 4:
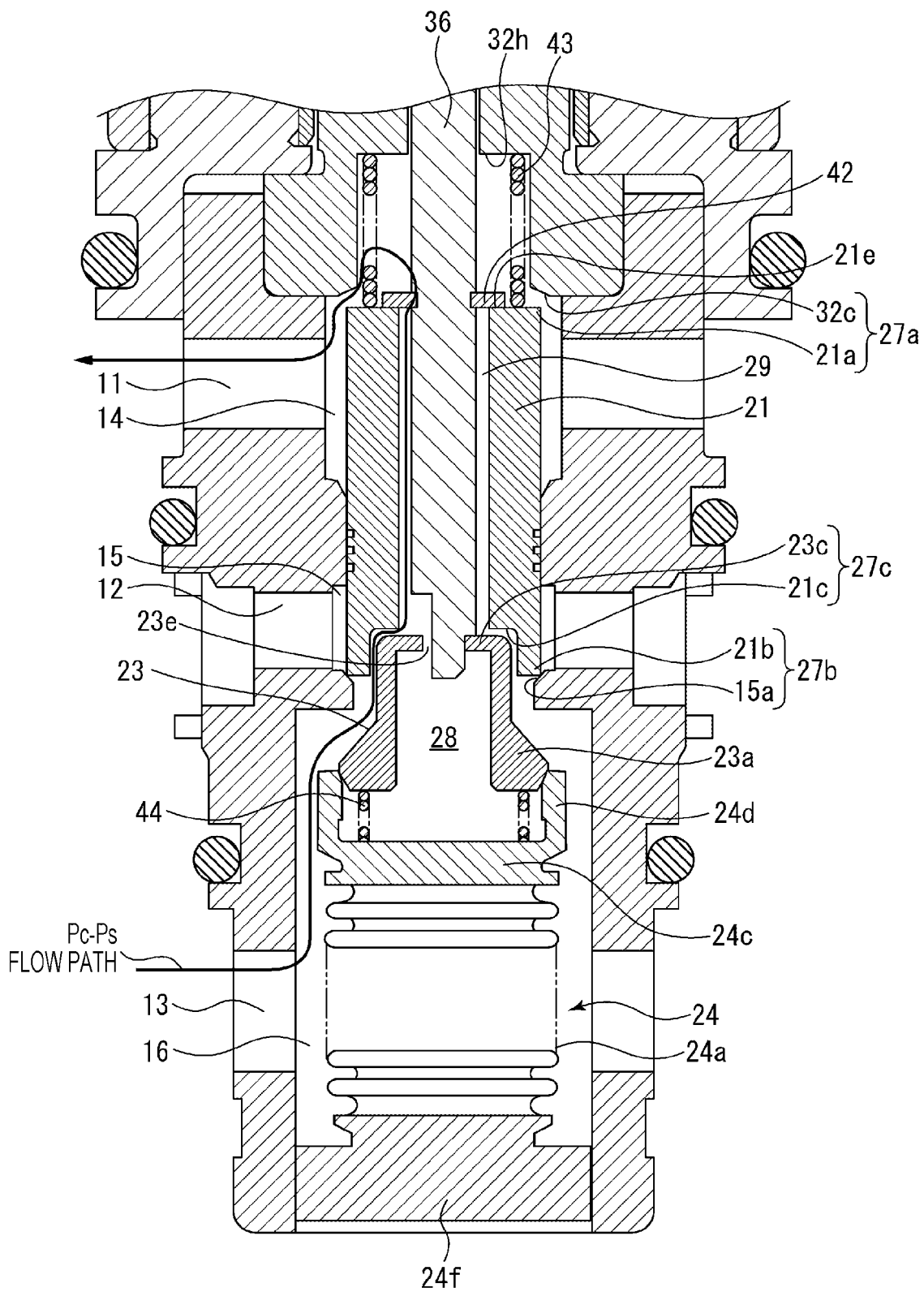
FIG. 4 is an enlarged view of the valve body, the valve element, and a part of the solenoid of FIG. 1, and shows a state of the capacity control valve during a liquid refrigerant discharge.
Figure 5:
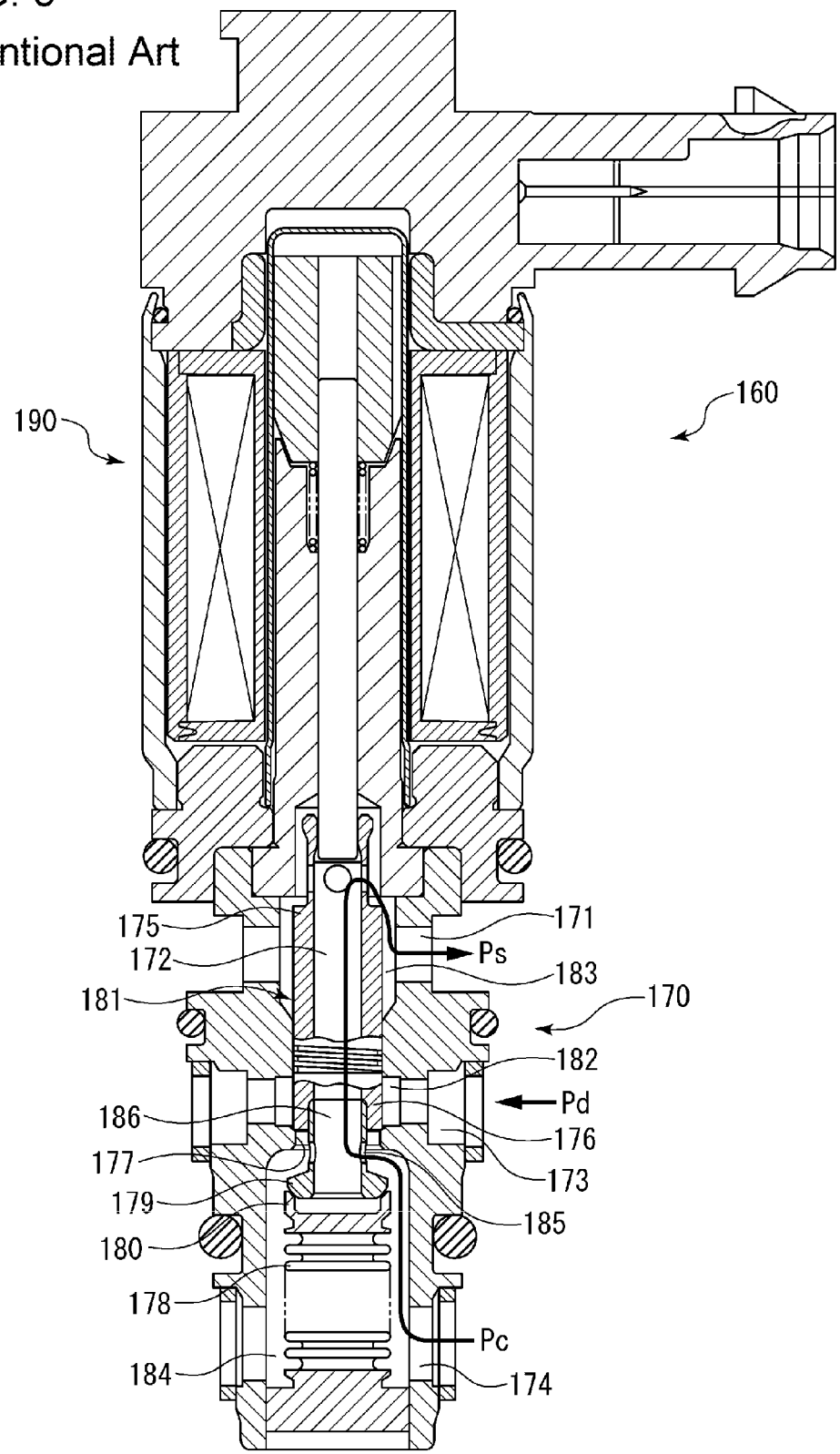
FIG. 5 is a front sectional view showing a conventional capacity control valve.
Figure 6:
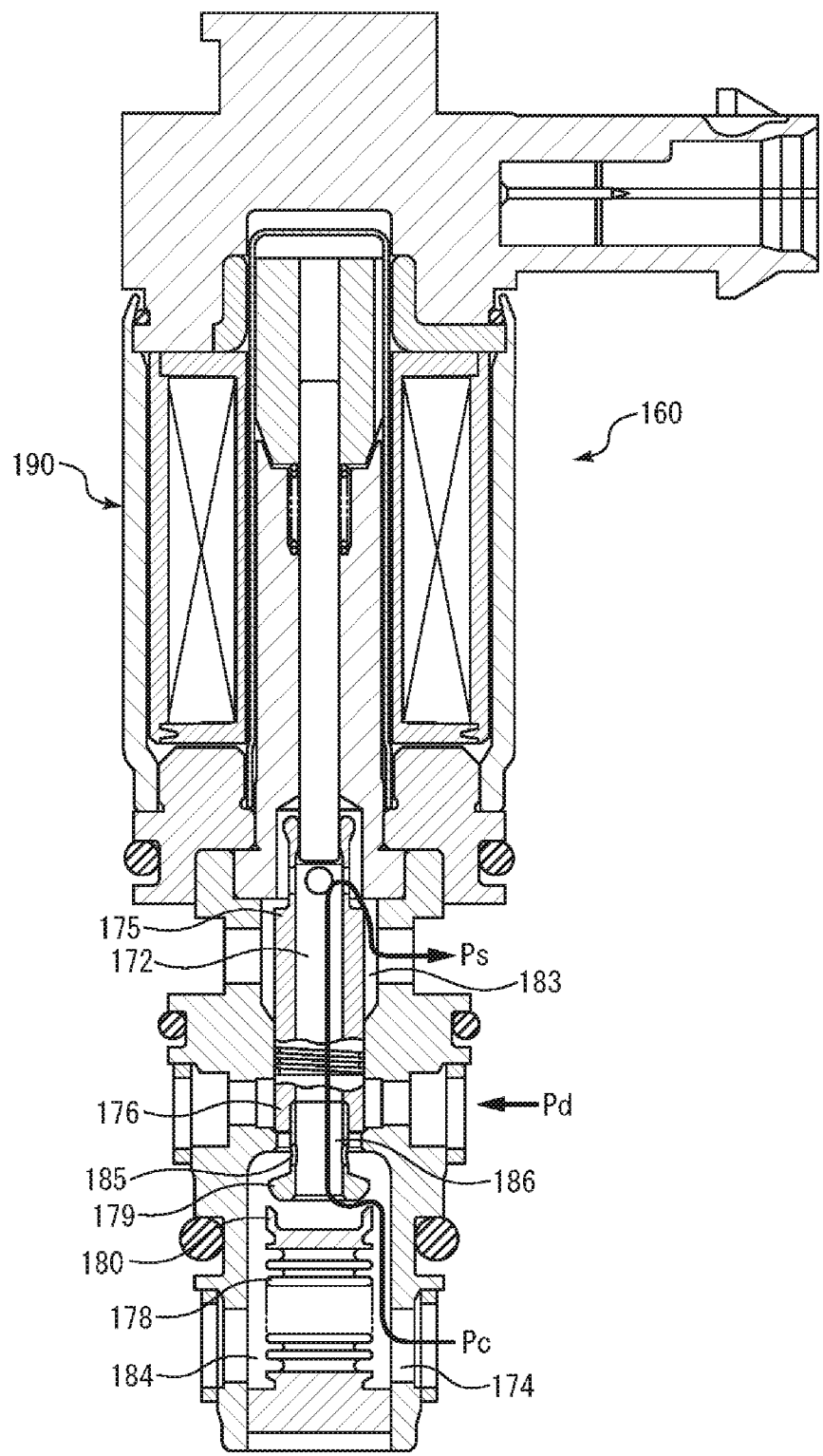
FIG. 6 shows the conventional capacity control valve and a state of the capacity control valve during a liquid refrigerant discharge.

When the rod 36 is further driven in the advancing direction, the shutoff valve 27a is brought into a fully open state as shown in FIG. 4, the main valve portion 21b comes into contact with the main valve seat 15a so that the main valve 27b is brought into a fully closed state, and the movement of the valve element 21 is stopped. When the rod 36 is further driven in the advancing direction from this state, the rod 36 moves relative to the valve element 21, the bottom 23c of the adapter 23 is separated from the auxiliary valve portion 21c of the valve element 21 so that the auxiliary valve 27c opens. When the rod 36 is further driven, the opening of the auxiliary valve 27c further increases, and when the spring 44 is contracted by a predetermined amount, a locking member 42 fixed to the rod 36 comes into contact with the end 21e of the valve element 21 to stop the movement of the rod 36, so that the auxiliary valve 27c is brought into a fully open state. Even if the valve element 21 is stopped in a state where the main valve 27b is not closed, the locking member 42 comes into contact with the end 21e of the valve element 21 and presses the valve element 21 in the valve closing direction of the main valve 27b by using the solenoid force, allowing the main valve 27b to be brought into the fully closed state. Furthermore, in order not to hinder the flow of the refrigerant in the Pc-Ps flow path even when the locking member 42 is in contact with the end 21e of the valve element 21, a communication passage (not shown) is formed in the valve element 21 or the locking member 42.

Next, a control state of the capacity control valve 1 will be described with reference to FIG. 3. The control state is a state in which the auxiliary valve 27c is in a closed state, and the main valve 27b is set to have a predetermined opening so that the pressure in the suction chamber of the variable capacity compressor is controlled to reach the set value Pset. In this state, the fluid under the suction pressure Ps flowing from the suction chamber of the variable capacity compressor through the first communication passages 11, the first valve chest 14, and the shutoff valve 27a is guided to the interior space 28 through the intermediate communication passage 29 and the hole 23e of the adapter 23, so that the pressure-sensitive element 24 extends and contracts according to the suction pressure Ps. As a result, the main valve portion 21b is stopped at a position where a force of the spring 43 in the valve closing direction, a force of the spring 37 and the spring 44 in the valve opening direction, a force of the solenoid 30, and a force of the pressure-sensitive element 24 which extends and contracts according to the suction pressure Ps are balanced, and the pressure in the suction chamber of the variable displacement compressor is controlled so as to reach the set value Pset. However, even if the opening of the main valve 27b is set to a predetermined opening, the pressure Ps in the suction chamber may fluctuate with respect to the set value Pset due to disturbance or the like. For example, when the pressure Ps in the suction chamber becomes higher than the set value Pset due to disturbance or the like, the pressure-sensitive element 24 contracts and the opening of the main valve 27b becomes smaller. Thus, the Pd-Pc flow path is narrowed, so that the amount of refrigerant under the discharge pressure Pd flowing from the discharge chamber to the crank chamber reduces and the pressure in the crank chamber decreases. As a result, the angle of inclination of the swash plate of the compressor becomes larger, and the discharge capacity of the compressor increases, causing the discharge pressure to decrease. On the other hand, when the pressure Ps in the suction chamber becomes lower than the set value Pset, the pressure-sensitive element 24 extends and the opening of the main valve 27b becomes larger. Thus, the Pd-Pc flow path is extended, so that the amount of refrigerant under the discharge pressure Pd flowing from the discharge chamber to the crank chamber increases, and the pressure in the crank chamber increases. As a result, the angle of inclination of the swash plate of the compressor becomes smaller, causing the discharge capacity of the compressor to reduce and causing the discharge pressure to increase. Thus, the capacity control valve 1 can control the pressure in the suction chamber of the variable capacity compressor so as to reach the set value Pset.

Next, a liquid refrigerant discharge state of the capacity control valve 1 will be described with reference to FIG. 4. After the compressor is stopped for a long period of time, a liquid refrigerant (a refrigerant that has been liquefied by cooling while the compressor is inoperative) is accumulated in the crank chamber. Therefore, in order to secure a predetermined discharge pressure and discharge flow rate after activating the compressor, it is necessary to discharge the liquid refrigerant as quickly as possible. During the liquid refrigerant discharge, the pressure in the third valve chest 16 communicating with the crank chamber and the suction pressure Ps become higher, the pressure-sensitive element 24 largely contracts, and the valve element 21 is pressed downward by the spring 43, so that the main valve 27b is brought into a closed state and the auxiliary valve 27c is brought into an open state. Even in this state, the liquid refrigerant can be discharged from the crank chamber to the suction chamber through the Pc-Ps flow path. However, as the discharge of the liquid refrigerant discharge progresses, the pressure in the third valve chest 16 and the suction pressure Ps gradually decrease, so that the opening of the auxiliary valve 27c gradually becomes smaller, resulting in an increase in time to complete the discharge of the liquid refrigerant. Then, the solenoid 30 is driven in the advancing direction to press the adapter 23 with the rod 36, forcibly bringing the auxiliary valve 27c into the fully open state. Thus, the auxiliary valve 27c is kept in the fully open state, so that the opening of the auxiliary valve 27c does not change from the start of the liquid refrigerant discharge to the completion of the liquid refrigerant discharge, allowing the liquid refrigerant to be discharged from the crank chamber to the suction chamber thorough the Pc-Ps flow path in a short time.

Conventionally, during the liquid refrigerant discharge operation, attention has been focused only on how to complete the discharge of the liquid refrigerant in a short time, so the engine load may become excessive during the liquid refrigerant discharge operation. Meanwhile, during the liquid refrigerant discharge using the conventional capacity control valve, the auxiliary valve 27c is brought into the open state, so that no biasing force acts on the valve element 21 from the pressure-sensitive element 24, making it difficult to quickly drive the valve element 21. The capacity control valve 1 according to the present invention can quickly drive the valve element 21 even during the liquid refrigerant discharge. The operation of the capacity control valve 1 for reducing the engine load during the liquid refrigerant discharge will be described.

In order to reduce the engine load during the liquid refrigerant discharge, the solenoid 30 is turned off, and a magnetic attraction force Fsol between the core 32 and the plunger 35 is set to zero. Since the upward pressure and the downward pressure acting on the valve element 21 are set to cancel each other, the main force acting on the valve element 21 during the liquid refrigerant discharge is the biasing force of the spring 37 acting in the valve opening direction of the main valve 27b, and the resultant force of the biasing force of the spring 43 acting in the valve closing direction of the main valve 27b and the magnetic attraction Fsol of the solenoid 30, which are balanced. Here, when the magnetic attraction force Fsol of the solenoid 30 becomes zero, the biasing force of the spring 37 acting in the valve opening direction of the main valve 27b becomes dominant, the rod 36 moves upward, the spring 44 extends so that the auxiliary valve 27c closes, and the valve element 21 and the adapter 23 are rapidly pushed up, so that the main valve 27b is fully opened. When the main valve 27b fully opens, the amount of refrigerant flowing from the discharge chamber of the compressor to the crank chamber through the Pd-Pc flow path increases, and the pressure Pc in the crank chamber becomes higher, so that the compressor operates with the minimum capacity. Thus, likewise during the liquid refrigerant discharge, even in a state where the auxiliary valve 27c is in the open state and no force acts on the valve element 21 from the pressure-sensitive element 24, the load on the compressor can be reduced, and therefore the engine load can be reduced also during the liquid refrigerant discharge.

Furthermore, also in order to reduce the load on the engine in a state in which the capacity control valve 1 controls the pressure in the suction chamber of the compressor so as to reach the set value Pset, by bringing the solenoid 30 into the non-energized state, as described above, the main valve 27b is brought into the fully open state to increase the amount of refrigerant under the pressure Pd flowing from the discharge chamber of the compressor to the crank chamber through the Pd-Pc flow path, allowing the compressor to operate with a minimum capacity and perform the operation for reducing the load on the engine.

Thus, the rod 36, the valve element 21, and the adapter 23 move integrally while the main valve 27b is brought from the fully open state into the fully closed state, and after the main valve 27b is fully closed, the rod 36 moves relative to the valve element 21 to press the adapter 23, allowing the auxiliary valve 27c to be opened. That is, one rod 36 can open and close three different valves, the shutoff valve 27a, the main valve 27b, and the auxiliary valve 27c. Thus, likewise during the liquid refrigerant discharge, even in a state where the auxiliary valve 27c is in the open state and no force acts on the valve element 21 from the pressure-sensitive element 24, the main valve 27b can be quickly fully opened, so that the shutoff valve 27a, the main valve 27b, and the auxiliary valve 27c can be opened and closed in any combination.

Although the embodiment according to the present invention has been described using the drawings, its specific configuration is not limited to these embodiments. Any changes and additions made without departing from the scope of the present invention are included in the present invention.

Furthermore, in the above embodiment, a first pressure is the suction pressure Ps of the variable capacity compressor, a second pressure is the discharge pressure Pd of the variable capacity compressor, and a third pressure is the pressure Pc in the crank chamber of the variable capacity compressor, but is not limited to this. The first pressure may be the pressure Pc in the crank chamber of the variable capacity compressor, the second pressure be the discharge pressure Pd of the variable capacity compressor, and the third pressure be the suction pressure Ps of the variable capacity compressor, so that the present invention can be applied to various variable capacity compressors.

REFERENCE SIGNS LIST 1 variable capacity compressor
10 valve body
11 first communication passages
12 second communication passages
13 third communication passages
14 first valve chest
15 second valve chest
15a main valve seat
16 third valve chest
17 valve hole
21 valve element
21a shutoff valve portion
21b main valve portion
21c auxiliary valve portion
23 adapter
23c bottom (auxiliary valve seat)
24 pressure-sensitive element
24a bellows
24c flange portion
27a shutoff valve 27b main valve
27c auxiliary valve
28 interior space
29 intermediate communication passage
30 solenoid unit
31 electromagnetic coil
32 core
35 plunger
36 rod
42 locking portion
43 spring (first biasing member)
44 spring (second biasing member)
Fsol magnetic attraction force
Ps suction pressure (first pressure) (third pressure)
Pd discharge pressure
Pc control chamber pressure (third pressure) (first pressure)
Pset suction pressure set value

The invention claimed is:

1. A capacity control valve that controls a flow rate or a pressure of a variable capacity compressor according to a valve opening of a valve unit, comprising:
    a valve body including first communication passages that pass fluid under a first pressure, second communication passages that are arranged adjacent to the first communication passages and pass fluid under a second pressure, third communication passages that pass fluid under a third pressure, and a main valve seat that is disposed in a valve hole communicating the second communication passages and the third communication passages, wherein the first pressure is a suction pressure of the variable capacity compressor, the second pressure is a discharge pressure of the variable capacity compressor, and the third pressure is a pressure in a crank chamber of the variable capacity compressor;
    a pressure-sensitive element that is arranged in the valve body on a side of the third communication passages and extends and contracts in response to an ambient pressure;
    a valve element including an intermediate communication passage that communicates the first communication passages and the third communication passages, a main valve portion that is separated from and comes into contact with the main valve seat to open and close the valve hole, and an auxiliary valve portion that is disposed in the intermediate communication passage;
    a solenoid that drives a rod whose end part is inserting into a hole part of an adapter provided with an auxiliary valve seat that is separated from and comes into contact with the auxiliary valve portion;
    a first spring that biases in a valve closing direction of the main valve portion; and
    a second spring that biases in a valve closing direction of the auxiliary valve portion,
    wherein:
    the intermediate communication passage permanently communicates with an interior space of the adaptor between the auxiliary valve seat and the pressure-sensitive element via the hole part,
    the pressure-sensitive element is extended and contracted in accordance with the suction pressure transmitted to the interior space through the intermediate communication passage, and
    the rod moves relative to the valve element in a manner that the auxiliary valve portion opens and closes the intermediate communication passage by detaching and touching the auxiliary valve seat.

2. The capacity control valve according to claim 1, wherein the first spring is disposed between the solenoid and the valve element.

3. The capacity control valve according to claim 2, wherein the second spring is disposed between the pressure-sensitive element and the auxiliary valve seat.

4. The capacity control valve according to claim 2, wherein the rod includes a locking portion that presses the valve element in the valve closing direction of the main valve portion.

5. The capacity control valve according to claim 1, wherein the second spring is disposed between the pressure-sensitive element and the auxiliary valve seat.

6. The capacity control valve according to claim 5, wherein the rod includes a locking portion that presses the valve element in the valve closing direction of the main valve portion.

7. The capacity control valve according to claim 1, wherein the rod includes a locking portion that presses the valve element in the valve closing direction of the main valve portion.

* * * * *